(12) United States Patent
Biler

(10) Patent No.: US 7,460,358 B2
(45) Date of Patent: Dec. 2, 2008

(54) SOLID ELECTROLYTIC CAPACITOR CONTAINING A PROTECTIVE ADHESIVE LAYER

(75) Inventor: Martin Biler, Novy Jicin (CZ)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 11/689,042

(22) Filed: Mar. 21, 2007

(65) Prior Publication Data

US 2008/0232035 A1    Sep. 25, 2008

(51) Int. Cl.
*H01G 9/00* (2006.01)

(52) U.S. Cl. .................................... 361/523

(58) Field of Classification Search ................. 361/523, 361/524, 528
See application file for complete search history.

(56) References Cited

U.S. PATENT DOCUMENTS

| | | | |
|---|---|---|---|
| 3,345,545 A | 10/1967 | Bourgault et al. | |
| 3,653,959 A | 4/1972 | Kehr et al. | |
| 4,085,435 A | 4/1978 | Galvagni | |
| 4,609,971 A | 9/1986 | Shaffer | |
| 4,785,380 A | 11/1988 | Harakawa et al. | |
| 4,794,491 A | 12/1988 | Saiki | |
| 4,805,074 A | 2/1989 | Harakawa et al. | |
| 4,910,645 A | 3/1990 | Jonas et al. | |
| 4,934,033 A | 6/1990 | Harakawa et al. | |
| 4,945,452 A | 7/1990 | Sturmer et al. | |
| 4,959,430 A | 9/1990 | Jonas et al. | |
| 5,005,107 A | 4/1991 | Kobashi et al. | |
| 5,017,272 A | 5/1991 | Kamigawa | |
| 5,119,274 A | 6/1992 | Kinuta et al. | |
| 5,135,618 A | 8/1992 | Saiki et al. | |
| 5,187,650 A | 2/1993 | Kudoh et al. | |
| 5,198,968 A | 3/1993 | Galvagni | |
| 5,357,399 A | 10/1994 | Salisbury | |
| 5,394,295 A | 2/1995 | Galvagni et al. | |
| 5,424,907 A | 6/1995 | Kojima et al. | |
| 5,436,796 A | 7/1995 | Abe et al. | |
| 5,457,862 A | 10/1995 | Sakata et al. | |
| 5,473,503 A | 12/1995 | Sakata et al. | |
| 5,495,386 A | 2/1996 | Kulkarni | |
| 5,586,000 A | 12/1996 | Sakata et al. | |
| 5,729,428 A | 3/1998 | Sakata et al. | |
| 5,807,636 A | 9/1998 | Sheu et al. | |
| 5,812,367 A | 9/1998 | Kudoh et al. | |
| 5,914,852 A | 6/1999 | Hatanaka et al. | |
| 5,949,639 A | 9/1999 | Maeda et al. | |
| 6,001,281 A | 12/1999 | Lessner et al. | |
| 6,106,950 A | 8/2000 | Searle et al. | |
| 6,128,180 A | 10/2000 | Araki et al. | |
| 6,154,358 A | 11/2000 | Fukaumi et al. | |
| 6,191,936 B1 | 2/2001 | Webber et al. | |
| 6,197,252 B1 | 3/2001 | Bishop et al. | |
| 6,219,223 B1 | 4/2001 | Kobayashi et al. | |
| 6,322,912 B1 | 11/2001 | Fife | |
| 6,334,966 B1 | 1/2002 | Hahn et al. | |
| 6,369,239 B2 | 4/2002 | Rauchschwalbe et al. | |
| 6,430,033 B1 | 8/2002 | Mitsui et al. | |
| 6,519,135 B2 | 2/2003 | Sano et al. | |
| 6,519,137 B1* | 2/2003 | Nitta et al. ................... | 361/525 |
| 6,528,662 B2 | 3/2003 | Jonas | |
| 6,580,601 B2 | 6/2003 | Hamada et al. | |
| 6,616,713 B2 | 9/2003 | Sano et al. | |
| 6,674,635 B1 | 1/2004 | Fife et al. | |
| 6,756,473 B2 | 6/2004 | Reuter et al. | |
| 6,771,488 B2* | 8/2004 | Takagi et al. ................. | 361/523 |
| 6,864,147 B1 | 3/2005 | Fife et al. | |
| 6,870,727 B2 | 3/2005 | Edson et al. | |
| 6,891,016 B2 | 5/2005 | Reuter et al. | |
| 6,894,890 B2 | 5/2005 | Takatani et al. | |
| 6,920,036 B1* | 7/2005 | Tseng et al. ................. | 361/525 |
| 6,965,508 B2 | 11/2005 | Takatani et al. | |
| 7,102,016 B2 | 9/2006 | Reuter | |
| 7,154,742 B1 | 12/2006 | Hahn et al. | |
| 7,341,801 B2 | 3/2008 | Reuter et al. | |
| 2005/0270725 A1 | 12/2005 | Hahn et al. | |
| 2006/0050469 A1* | 3/2006 | Anzai et al. ................. | 361/523 |
| 2006/0180797 A1 | 8/2006 | Merker et al. | |
| 2006/0292384 A1 | 12/2006 | Kazaryan et al. | |
| 2007/0072362 A1* | 3/2007 | Tseng et al. ................. | 438/239 |

FOREIGN PATENT DOCUMENTS

| | | |
|---|---|---|
| EP | 0507315 A1 | 10/1992 |
| EP | 0559109 A1 | 9/1993 |

(Continued)

OTHER PUBLICATIONS

Abstract of Japanese Patent No. 1253226 dated Oct. 9, 1989.

(Continued)

*Primary Examiner*—Eric Thomas
(74) *Attorney, Agent, or Firm*—Dority & Manning, P.A.

(57) ABSTRACT

An electrolytic capacitor containing a protective adhesive layer positioned between the dielectric layer and the solid electrolyte layer (e.g., a conductive polymer layer, manganese dioxide) is generally disclosed. The protective adhesive layer can include a polymer having a repeating unit with a functional hydroxyl group, such as poly(vinyl alcohol). For instance, the polymer can be at least 90 mole % hydrolyzed. The polyvinyl alcohol can be a co-polymer of vinyl alcohol and a monomer, such as an acrylic ester like a methacrylic ester (e.g., methyl methacrylate).

42 Claims, No Drawings

FOREIGN PATENT DOCUMENTS

| | | | |
|---|---|---|---|
| EP | 0571329 | A2 | 11/1993 |
| EP | 0571329 | A3 | 11/1993 |

OTHER PUBLICATIONS

Abstract of Japanese Patent No. 2219211 dated Aug. 31, 1990.
Abstract of Japanese Patent No. 2238613 dated Sep. 20, 1990.
Abstract of Japanese Patent No. 2249221 dated Oct. 5, 1990.
Abstract of Japanese Patent No. 3034303 dated Feb. 14, 1991.
Abstract of Japanese Patent No. 3046215 dated Feb. 27, 1991.
Abstract of Japanese Patent No. 3064013 dated Mar. 19, 1991.
Abstract of Japanese Patent No. 3072615 dated Mar. 27, 1991.
Abstract of Japanese Patent No. 3073509 dated Mar. 28, 1991.
Abstract of Japanese Patent No. 3078222 dated Apr. 3, 1991.
Abstract of Japanese Patent No. 3080522 dated Apr. 5, 1991.
Abstract of Japanese Patent No. 3093216 dated Apr. 18, 1991.
Abstract of Japanese Patent No. 3093217 dated Apr. 18, 1991.
Abstract of Japanese Patent No. 3096210 dated Apr. 22, 1991.
Abstract of Japanese Patent No. 3167816 dated Jul. 19, 1991.
Abstract of Japanese Patent No. 3183111 dated Aug. 9, 1991.
Abstract of Japanese Patent No. 3280523 dated Dec. 11, 1991.
Abstract of Japanese Patent No. 3285321 dated Dec. 16, 1991.
Abstract of Japanese Patent No. 4025009 dated Jan. 28, 1992.
Abstract of Japanese Patent No. 4034915 dated Feb. 5, 1992.
Abstract of Japanese Patent No. 4042912 dated Feb. 13, 1992.
Abstract of Japanese Patent No. 4044305 dated Feb. 14, 1992.
Abstract of Japanese Patent No. 4048710 dated Feb. 18, 1992.
Abstract of Japanese Patent No. 4053115 dated Feb. 20, 1992.
Abstract of Japanese Patent No. 4073924 dated Mar. 9, 1992.
Abstract of Japanese Patent No. 4111407 dated Apr. 13, 1992.
Abstract of Japanese Patent No. 4206811 dated Jul. 28, 1992.
Abstract of Japanese Patent No. 4307915 dated Oct. 30, 1992.
Abstract of Japanese Patent No. 4315412 dated Nov. 6, 1992.
Abstract of Japanese Patent No. 4315413 dated Nov. 6, 1992.
Abstract of Japanese Patent No. 5047604 dated Feb. 26, 1993.
Abstract of Japanese Patent No. 5129160 dated May 25, 1993.
Abstract of Japanese Patent No. 5136006 dated Jun. 1, 1993.
Abstract of Japanese Patent No. 5152169 dated Jun. 18, 1993.
Abstract of Japanese Patent No. 5159983 dated Jun. 25, 1993.
Abstract of Japanese Patent No. 5234820 dated Sep. 10, 1993.
Abstract of Japanese Patent No. 5283291 dated Oct. 29, 1993.
Abstract of Japanese Patent No. 6077093 dated Mar. 18, 1994.
Abstract of Japanese Patent No. 6112094 dated Apr. 22, 1994.
Abstract of Japanese Patent No. 6112095 dated Apr. 22, 1994.
Abstract of Japanese Patent No. 6112096 dated Apr. 22, 1994.

* cited by examiner

SOLID ELECTROLYTIC CAPACITOR CONTAINING A PROTECTIVE ADHESIVE LAYER

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. Nos. 5,457,862 to Sakata, et al., 5,473,503 to Sakata et al., 5,729,428 to Sakata, et al., and 5,812,367 to Kudoh, et al. In some electrolytic capacitors, a polymeric layer can be included between the dielectric oxide film and the solid electrolyte layer or cathode. For example, esters of unsaturated or saturated fatty acids have been used to form such a polymeric layer. See, e.g., U.S. Pat. No. 6,674,635 of Fife, et al. and U.S. Pat. No. 6,864,147 of Fife, et al. However, a need for an improvement nevertheless remains.

SUMMARY OF THE INVENTION

In accordance with one embodiment of the present invention, a solid electrolytic capacitor is disclosed that comprises an anode; a dielectric layer overlying the anode; a protective adhesive layer overlying the dielectric layer; and a solid electrolyte layer overlying the protective adhesive layer. The protective adhesive layer comprises a polymer having a repeating unit with a functional hydroxyl group.

Other features and aspects of the present invention are set forth in greater detail below.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrolytic capacitor containing a protective adhesive layer positioned between the dielectric layer and the solid electrolyte layer (e.g., a conductive polymer layer). The protective adhesive layer can improve the adherence of the solid electrolyte layer to the dielectric layer improving the coverage of the solid electrolyte, and thus increasing the capacitance of the resulting electrolytic capacitor. For example, the protective adhesive layer can, through attraction forces (e.g., van Der Waals, ionic bonding, hydrogen bonding), bond to the dielectric layer and/or the solid electrolyte layer to adhere the layers together. As such, the dielectric layer and/or the solid electrolyte layer can be strongly adhered to each other.

The solid electrolytic capacitor of the present invention generally contains an anode formed from a valve metal composition. The valve metal composition may have a high specific charge, such as about 5,000 microFarads*Volts per gram ("µF*V/g") or more, in some embodiments about 10,000 µF*V/g or more, in some embodiments from about 15,000 µF*V/g to about 250,000 µF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the anode may be formed from a valve metal oxide having an atomic ratio of metal to oxygen of 1: less than 25, in some embodiments 1: less than 2.0, in some embodiments 1: less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes.

Conventional fabricating procedures may generally be utilized to form the anode. In one embodiment, a tantalum or niobium oxide powder having a certain particle size is first selected. The particle size may vary depending on the desired voltage of the resulting electrolytic capacitor element. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water and alcohols. When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode subsequent to pressing and/or sintering of the anode.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

Regardless of the particular manner in which it is form, the thickness of the anode may be selected to improve the electrical performance of the electrolytic capacitor element. For example, the thickness of the anode (in the −z direction in FIG. 1) may be about 4 millimeters or less, in some embodiments, from about 0.2 to about 3 millimeters, and in some embodiments, from about 0.4 to about 2 millimeters. Such a relatively small anode thickness (i.e., "low profile") helps dissipate heat generated by the high specific charge powder and also provide a shorter transmission path to minimize ESR and inductance. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

The anode may be anodized so that a dielectric layer is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. The anode may be dipped into a weak acid solution (e.g., phosphoric acid) at an elevated temperature (e.g., about 60° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric quality is formed over the surface of the tantalum pellet. The anodization voltage typically ranges from about 5 to about 200 volts, and in some embodiments, from about 20 to about 100 volts. In addition to being formed on the surface of the anode, a portion of the dielectric oxide film will also typically form on the surfaces of the pores. It should be understood that the dielectric layer may be formed from other types of materials and using different techniques.

According to the present invention, a protective adhesive layer is formed over the dielectric layer to help adhere the dielectric layer to the cathode layers. The protective adhesive layer can improve the adherence of the solid electrolyte layer to the dielectric layer and increase the capacitance of the resulting electrolytic capacitor. For example, the protective adhesive layer can, through attraction forces (e.g., van Der Waals, ionic bonding, hydrogen bonding), bond to the dielectric layer and/or the solid electrolyte layer to adhere the layers together. As such, the dielectric layer and/or the solid electrolyte layer can be strongly adhered to each other.

The protective adhesive layer can generally include a variety of materials that are capable of forming a thin coating and that can improve the electrical performance of the resulting capacitor. In one particular embodiment, the protective adhesive layer may include, for instance, a polymer containing a repeating unit with a functional hydroxyl group. As such, the resulting polymer may have at least two hydroxyl groups along the polymer chain. Suitable polymers having a repeating unit with a functional hydroxyl group include polyvinyl alcohol ("PVA"), copolymers of polyvinyl alcohol (e.g., ethylene vinyl alcohol copolymers, methyl methacrylate vinyl alcohol copolymers, etc.), polysaccharides, etc. The presence of hydroxyl groups in the polymer may provide adhesive characteristics to the protective adhesive layer that help bond to the dielectric layer to the solid electrolyte, such as a conductive polymer. For example, without wishing to be bound by theory, it is believed that the hydroxyl groups can increase the adhesion of the layers through attraction and/or bonds (e.g., van Der Waals forces, hydrogen bonding, ionic bonds, covalent bonds, etc.).

Suitable vinyl alcohol polymers, for instance, have at least two or more vinyl alcohol units in the molecule and may be a homopolymer of vinyl alcohol, or a copolymer containing other monomer units. Vinyl alcohol homopolymers may be obtained by hydrolysis of a vinyl ester polymer, such as vinyl formate, vinyl acetate, vinyl propionate, etc. Vinyl alcohol copolymers may be obtained by hydrolysis of a copolymer of a vinyl ester with an olefin having 2 to 30 carbon atoms, such as ethylene, propylene, 1-butene, etc.; an unsaturated carboxylic acid having 3 to 30 carbon atoms, such as acrylic acid, methacrylic acid, crotonic acid, maleic acid, fumaric acid, etc., or an ester, salt, anhydride or amide thereof; an unsaturated nitrile having 3 to 30 carbon atoms, such as acrylonitrile, methacrylonitrile, etc.; a vinyl ether having 3 to 30 carbon atoms, such as methyl vinyl ether, ethyl vinyl ether, etc.; and so forth.

The use of vinyl alcohol copolymers may be particularly desired in the present invention to increase the adhesion properties of the protective adhesive layer to the dielectric layer and solid electrolyte. An acrylic or methacrylic ester, for instance, may be copolymerized with a vinyl ester to provide a hydrophilic polymer having excellent adhesion properties, while adding soft and flexible properties to the layer. Suitable esters of acrylic acid or methacrylic acid may include esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-, iso- and t-butyl acrylate, n-, iso- and t-butyl methacrylate, 2-ethylhexyl acrylate, etc. The fraction of these comonomers may range from about 30 mol % to about 70 mole %, and in some embodiments, from about 40 mol % to about 60 mol % of the vinyl alcohol copolymer.

Regardless of the monomers employed, the degree of hydrolysis may be selected to increase the adhesive properties of the polymer. For example, the degree of hydrolysis may be about 90 mole % or greater, in some embodiments about 95 mole % or greater, and in some embodiments, about 98 mole % or more. For a vinyl alcohol homopolymer, this would mean that about 90 mole % or greater, in some embodiments about 95 mole % or greater, and in some embodiments, about 98 mole % or more of the acetate groups on the parent polymer are hydrolyzed. Examples of suitable highly hydrolyzed polyvinyl alcohol polymers are available under the trade name Mowiol® from Kuraray Specialties Europe GmbH, Frankfurt, such as Mowiol® 3-98, Mowiol® 4-98, and Mowiol® 6-98.

In addition, other materials may be employed to improve the adhesive nature of the protective adhesive layer. Examples of such materials include acrylate or methacrylate polymers, such as polymethyl methacrylate, polyethyl methacrylate, polypropyl methacrylate, polybutyl methacrylate, hydroxyethylmethacrylate, etc.; polyurethane; polystyrene; esters of unsaturated or saturated fatty acids (e.g., glycerides); etc. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other resinous materials are described in more detail in U.S. Pat. No. 6,674,635 of Fife et al. and U.S. Pat. No. 6,864,147 of Fife et al., both of which are incorporated herein in their entirety by reference thereto for all purposes.

The material(s) of the protective adhesive layer are typically more resistive than the conductive polymer that of the solid electrolyte. For example, the protective adhesive layer may contain a material having a resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Despite possessing such insulative properties the protective adhesive layer does not typically have a significant adverse effect on the electrical performance of the capacitor. One reason for this is due to the relatively small thickness of the barrier, which is normally about 100 micrometers or less, in some embodiments about 50 micrometers or less, and in some embodiments, about 10 micrometers or less.

The protective adhesive layer can be applied in a variety of different ways. For example, in one embodiment, the anode part or slug can be dipped into a dipping solution of the desired protective adhesive layer material(s). The solution may be formed by dissolving or dispersing the materials in a solvent. The solvent is also useful in controlling the viscosity of the solution, thereby facilitating the formation of thin layers. Any solvent of a variety of solvents may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, iso-propanol, and butanol); triglycerides; ketones; esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth.

In one particular embodiment, the polymer having a repeating unit with a functional hydroxyl group can be water-soluble. As such, aqueous solvents (e.g., water) may be employed due to the hydrophilic nature of the protective adhesive layer polymers, which can result in simplified processing and decreased costs. In fact, water may constitute about 20 wt. % or more, in some embodiments, about 50 wt. % or more, and in some embodiments, about 75 wt. % to 100 wt. % of the solvent(s) used in the solution.

Once formed, the anode part can be dipped into the dipping solution one or more times, depending on the desired thickness of the protective adhesive layer. The number of layers that form the protective adhesive layer can be from about 2 to about 10 layers, and in some embodiments, from about 3 to about 7 layers. Besides dipping, it should also be understood that other conventional application methods, such as sputtering, screen printing, electrophoretic coating, electron beam deposition, vacuum deposition, spraying, and so forth, can also be used to deposit the protective adhesive layer. After forming the protective adhesive layer, it is often desired that the anode part be dried to facilitate evaporation of any solvent used during application. Typically, each layer is dried at a temperature ranging from about 30° C. to about 300° C., and in some embodiments, from about 50° C. to about 150° C., for a time period ranging from about 1 minute to about 60 minutes, and in some embodiments, from about 15 minutes to about 30 minutes. It should also be understood that heating need not be utilized after application of each layer, but may instead be utilized only after formation of the entire protective adhesive layer.

Once the protective adhesive layer is formed on the dielectric layer, a solid electrolyte is formed thereon. The solid electrolyte layer can be formed of any suitable material, such as manganese dioxide ($MnO_2$) or a conductive polymer layer. The use of manganese dioxide in a solid electrolyte layer is well known in the art.

In one particular embodiment, the solid electrolyte layer includes one or more conductive polymers. Suitable conductive polymers include, but are not limited to, polypyrroles; polythiophenes, such as poly(3,4-ethylenedioxy thiophene) (PEDT); polyanilines; polyacetylenes; poly-p-phenylenes; and derivatives thereof. If desired, the solid electrolyte can be formed from multiple conductive polymer layers, such as one layer formed from PEDT and another layer formed from a polypyrrole. Any suitable monomer(s) may be employed to form the conductive polymer. For example, 3,4-ethylene dioxythiophene (BAYTRON M, Bayer Corp.) may be used as a monomer for forming PEDT. An oxidative polymerization catalyst may be employed to initiate the polymerization of the monomer(s). The oxidative polymerization catalyst can be any transitional metal salt useful as an oxidizing agent, such as those transitional metal salts derivatized with organic ligands. A preferred oxidative polymerization catalyst can be an organic acid ligand combined with iron (III), such as iron (III) tosylate. One suitable oxidative polymerization catalyst is BAYTRON C, which is iron (III) toluene-sulphonate and n-butanol and sold by Bayer Corporation.

The monomer(s) (e.g., 3,4-ethylenedioxy thiophene) used to form the conductive polymer(s) (e.g., PEDT) may be mixed with an oxidative polymerization catalyst to form the conductive polymer layer. For example, the monomer solution and the oxidative polymerization catalyst can be sequentially added in separate solutions, and then polymerized on the electrolyte capacitor to form the conductive polymer.

Alternatively, the monomer(s) (e.g., 3,4-ethylenedioxy thiophene) used to form the conductive polymer(s) (e.g., PEDT) may be mixed with an oxidative polymerization catalyst to form a polymerization solution (e.g., dispersion, emulsion, suspension, mixture, and so forth) to enhance the efficiency of the solid electrolyte forming step. The oxidative polymerization catalyst can be present in the polymerization solution in any amount sufficient to cause oxidative polymerization of the monomer(s).

However, in one particular embodiment, less than the normally required molar equivalent of the oxidative polymerization catalyst can be used per mole of monomer in forming the conductive polymer layer (i.e., less than a stoichiometric amount of the oxidative polymerization catalyst). For instance, when the monomer includes 3,4-ethylenedioxy thiophene, the normally required molar ratio used to polymerize 3,4-ethylenedioxy thiophene into PEDT is about 1 mole 3,4-ethylenedioxy thiophene to about 18 moles oxidative polymerization catalyst. However, the present inventor has found that the use of less than the 18 moles of oxidative polymerization catalyst per mole of monomer can slow the polymerization of the monomer, creating oligomers that are shorter in length than if fully polymerized into a polymer. Without wishing to be bound by theory, it is believed that the excess monomer etches oligomers which provide better penetration into the porous anode. Thus, less than 18 moles of oxidative polymerization catalyst can be present in the polymerization solution per mole of monomer (e.g., 3,4-ethylenedioxy thiophene), such as less than about 15 moles of oxidative polymerization catalyst per mole of monomer. For example, about 5 to about 12 moles of oxidative polymerization catalyst can be present in the polymerization solution per mole of monomer, such as about 10 moles of oxidative polymerization catalyst per mole of monomer.

When mixed together in a single solution, a small portion of the monomer(s) tends to polymerize, even absent the application of heat. However, such premature polymerization may be substantially inhibited through the appropriate selection of a polar solvent that functions as a reaction inhibitor. In one particular embodiment, an aprotic polar solvent capable of donating electrons can be included in the polymerization solution. Without wishing to be bound by theory, it is believed that the localized negative charge on a polar solvent can attract, through electron donation (e.g., acid-base reactions), the positively charged metal (e.g., iron III) of the oxidative polymerization catalyst to form a weakly bonded complex. This weak complex may effectively inhibit the ability of the oxidative polymerization catalyst to oxidize the monomer for polymerization. As such, only a relatively small amount, if any, of the monomer is prematurely polymerized in the polymerization solution prior to its application to the electrolyte capacitor. Additionally, the life span on the polymerization solution can be greatly extended.

Additionally, polar solvents, such as aprotic solvents, can act as a dissolve any oligomers prematurely formed while still in the polymerization solution. Thus, the oligomers can be inhibited from further polymerization, and the shelf life of the polymerization solution can be extended, even if oligomers are prematurely formed. As such, the combination of the polar solvent and the monomer with less than a stoichiometric amount of the oxidative polymerization catalyst can provide further advantages to the method of producing the conductive polymer layer.

Particularly suitable polar solvents are aprotic solvents, such as dipolar aprotic solvents, which lack an acidic proton. Polar aprotic solvents include, but are not limited to, N-methylpyrrolidone, dimethyl sulfoxide, dimethylformamide, hexamethylphosphorotriamide, dimethyl acetamide, methyl ethyl ketone, and so forth.

In most embodiments, the polar solvent(s) are combined with one or more co-solvents to form a solvent system for the solution. In such embodiments, the weight ratio of the co-solvents(s) to the polar solvent(s) may be about 50:1 or more, in some embodiments from about 50:1 to about 250:1, and in some embodiments, from about 75:1 to about 150:1. For example, the polar solvent(s) may constitute from about 0.001 wt. % to about 10 wt. %, in some embodiments, from about 0.01 wt. % to about 5 wt. %, and in some embodiments, from about 0.05 wt. % to about 1 wt. % of the polymerization solution. Likewise, the co-solvent(s) may constitute from about 20 wt. % to about 90 wt. %, in some embodiments, from about 30 wt. % to about 80 wt. %, and in some embodiments, from about 40 wt. % to about 60 wt. % of the polymerization solution. It is believed that such a small amount of polar solvent in the complete solvent system of the polymerization solution can sufficiently inhibit premature polymerization, while still allowing polymerization once applied to the anode.

Any suitable co-solvent that is miscible with the polar solvent may be employed in the present invention. Exemplary co-solvents may include glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, isopropanol, and butanol); triglycerides; esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Particularly suitable co-solvent(s) are aliphatic alcohols, such as ethanol, propanol, methanol, isopropanol, butanol, and so forth.

The polymerization solution may also contain a dopant. The dopant may be an oxidizing or reducing agent, and can provide excess charge to the conductive polymer. For example, in one embodiment, the dopant can be any conventional anion. Particularly, the ions of aromatic sulfonic acids, aromatic polysulfonic acids, organic sulfonic acids including a hydroxy group, organic sulfonic acids including a carboxyl group, alycyclic sulfonic acids, benzoquinone sulfonic acids and other organic sulfonic acids can effectively stabilize the conductivity of a conducting polymer layer because their molecule sizes are large enough to obstruct easy dedoping in a high temperature atmosphere. Examples of such organic sulfonic acids are dodecylbenzene sulfonic acid, toluene sulfonic acid, benzyl sulfonic acid, naphthalene sulfonic acid, phenol sulfonic acid, sulfoisofuthalic acid, sulfosalicylic acid, camphor sulfonic acid, and adamantane sulfonic acid. In one embodiment, the dopant can be supplied from the same compound as the oxidative polymerization catalyst. For instance, iron III toluene-sulphonate can supply both the dopant (anion of toluene-sulphonate) and the oxidative polymerization catalyst (cation of iron III).

A binder may also be employed in the polymerization solution to facilitate adherence of the solid electrolyte to the dielectric layer. For example, the polymerization solution may contain organic binders which are soluble in organic solvents, such as poly(vinyl acetate), polycarbonate, poly (vinyl butyrate), polyacrylates, polymethacrylates, polystyrene, polyacrylonitrile, poly(vinyl chloride), polybutadiene, polyisoprene, polyethers, polyesters, silicones, and pyrrole/ acrylate, vinyl acetate/acrylate and ethylene/vinyl acetate copolymers each of which are soluble in organic solvents. It is also possible to use water-soluble binders such as polyvinyl alcohols as thickeners. Alternatively, those resinous material disclosed above in relation to the protective adhesive layers can be included in the polymerization solution as an organic binder.

Once the polymerization solution is formed, it may be applied to the anode part using any known technique. For instance, conventional techniques such as sputtering, screen-printing, dipping, electrophoretic coating, electron beam deposition, spraying, and vacuum deposition, can be used to form the conductive polymer coating. Although various methods have been described above, it should be understood that any other method for applying the conductive coating(s) to the anode part can also be utilized in the present invention. For example, other methods for applying such conductive polymer coating(s) may be described in U.S. Pat. Nos. 5,457, 862 to Sakata, et al., 5,473,503 to Sakata, et al., 5,729,428 to Sakata, et al., and 5,812,367 to Kudoh, et al., which are incorporated herein in their entirety by reference thereto for all purposes. Regardless of the application technique employed, the polymerization solution may be cooled to further stabilize the polymerization solution and prevent premature polymerization of the monomer(s). For example, the polymerization solution can be applied at a temperature of less than about 20° C., in some embodiments less than about 15° C., in some embodiments less than about 10° C., and in some embodiments, less than about 5° C.

Once applied, the conductive polymer may be healed. Healing may occur after each application of a conductive polymer layer or may occur after the application of the entire conductive polymer coating. In some embodiments, the conductive polymer can be healed by dipping the slug into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol).

After application of some or all of the layers described above, the slug may then be washed if desired to remove various byproducts, excess catalysts, and so forth. Further, in some instances, drying may be utilized after some or all of the dipping operations described above. For example, drying may be desired after applying the catalyst and/or after washing the slug in order to open the pores of the slug so that it can receive a liquid during subsequent dipping steps.

Once the solid electrolyte is formed, the part may then be applied with a carbon coating (e.g., graphite) and silver coating, respectively. The silver coating may, for instance, act as a solderable conductor, contact layer, and/or charge collector for the capacitor and the carbon coating may limit contact of the silver coating with the solid electrolyte. Lead electrodes may then be provided as is well known in the art. Typically, the silver coating includes silver and an organic binder, such as a resin (e.g., an epoxy resin).

Optionally, the formed capacitor can be coated with a barrier layer to help protect the capacitor from changes in its working environment. For instance, the barrier layer can enable the electrolytic capacitor to increase it performance in relatively high humidity and/or high temperature environments. The barrier layer can be positioned between the graphite coating and the silver coating. Alternatively, the barrier layer can be preferably positioned on the external surface of the silver coating to form the outermost layer of the resulting capacitor.

The barrier layer can include a barrier polymer configured to reduce oxygen and moisture permeability of the electrolyte capacitor without substantially affecting the functionality of the coated capacitor. For example, the barrier polymer can block passage of oxygen and/or moisture through the barrier layer by forming a structure that presents a tortuous path for water and/or oxygen molecules to travel. Thus, the barrier polymer can slow the transmission of the water and/or oxygen molecules through the barrier layer.

Additionally, the barrier polymer can adhere the barrier layer to the capacitor, such as to the silver coating having an organic binder. As such, the barrier layer can be intimately applied to the capacitor without substantially affecting the capacitor's performance. For example, the barrier polymer can bond (e.g., ionic bonding, hydrogen bonding, van Der Walls attraction, etc.) to the organic binder of the silver coating to secure the barrier layer to the capacitor. In some embodiments, these bonds can be initiated from functional hydroxyl groups positioned on the barrier polymer. The functional hydroxyl groups can, for instance, be provided from at least two hydroxyl groups (e.g., a polyol) or at least two alkoxy groups.

In one particular embodiment, the barrier polymer can be a polyurethane having multiple hydroxyl groups (e.g., a polyurethane diol). For example, the polyurethane can be selected from the family of polyether polyols, which have multiple hydroxyl groups capable of bonding to the organic binder of the silver coating. Additionally, polyurethane polymers generally have good barrier properties, and are generally stable in high temperature and/or high humidity environments. An alternative group of barrier polymers can be polyesters having functional alkoxy groups capable of bonding to the organic binder of the silver coating, similar to the functional hydroxyl groups discussed above.

In some embodiments, the barrier and adhesive properties of the barrier polymer can be increased by crosslinking the barrier polymer to form a 3-dimensional crosslinked network. For instance, the barrier polymer can be crosslinked by combining a polyfunctional crosslinking agent with the barrier polymer to produce the barrier layer. The addition of a polyfunctional crosslinking agent can provide improvements in adhesion, heat resistance, water and moisture resistance, and oxygen resistance to the barrier layer.

For example, the polyfunctional crosslinking agent can be a nitrogen-containing polymer. For example, a polymer containing polyfunctional aziridine groups can be utilized as a polyfunctional crosslinking agent. The term "aziridine" as used herein refers to an alkyleneimine group, and "polyfunctional aziridine" includes compounds produced by the polymerization of an alkyleneimine, such as ethyleneimine, ethylethyleneimine, propyleneimine, and mixtures and derivatives thereof. As such, the polyfunctional aziridine can include polyalkyleneimine polymers (e.g., polyethyleneimine, polyethylethyleneimine, and polypropyleneimine) or copolymers, and their derivatives. In one particular embodiment, the polyfunctional crosslinking agent can include polyethylenenimine, such as branched polyethyleneimine.

Without wishing to be bound by theory, it is believed that polyfunctional crosslinking agent can promote adhesion of the barrier layer to the capacitor by crosslinking the barrier polymer of the barrier layer with itself and to the organic binder of the silver coating. Also, the crosslinked barrier polymer can have increased barrier properties due to its crosslinked chemical structure that provides a more tortuous path through the barrier layer for the water or oxygen molecules. Also, crosslinking the barrier polymer provides the barrier layer with increased mechanical strength due to the crosslinked chemical structure of the barrier polymer and/or the polyfunctional crosslinking agent.

In one embodiment, polyalkyleneimine polymers (e.g., polyethyleneimine) are preferred due to their ability to form crosslinked structures themselves, in addition to crosslinking the polyurethane. For example, branched polyethyleneimine generally contains primary, secondary, and tertiary amines. These amine groups can provide bonding sites forming intermolecular bonds (e.g., hydrogen bonds, van Der Waals bonds, and/or ionic bonds) with other amine groups, with functional groups of the polyurethane, and possibly with any functional groups located on the surface of the capacitor. For example, when the barrier layer is applied to a silver or graphite coating containing an organic binder, the polyfunctional crosslinking agent can chemically attract, or possibly even bond, polymers of the barrier layer to the organic binder of the silver and/or graphite coatings. Additionally, polyalkyleneimine polymers are relatively polar polymers, allowing them to reduce the surface tension of any applied liquid (e.g., water vapor) to the barrier layer.

Another nitrogen-containing polymer useful as a polyfunctional crosslinking agent includes polyamides and derivatives and copolymers thereof. For instance, one particular polyamide useful as a polyfunctional crosslinking agent can be a polyamideimide. Other polyfunctional crosslinking agents can include polyfunctional isocyanate compounds having at least two or more isocyanate groups. Representative organic diisocyanates suitable for the primer coating are aromatic diisocyanates such as 2,4 tolylene diisocyanate, methylene-bis-p,p'-phenylene diisocyanate, 1,5-naphthalene diisocyanate, polymethylene diisocyanate such as tetramethylene diisocyanate, pentamethylene diisocyanate, hexamethylene diisocyanate, decamethylene diisocyanate, cycloalkylene diisocyanate such as cyclohexylene 1,4-diisocyanate, diisocyanates containing heteroatoms in the chain, and mixed isocyanates-isothiocyanates such as 1-isocyanate,6-isothiocyanate hexane. Other examples include toluenediisocyanate (TDI), triphenylmethanetriisocyanate (TTT), isophoronediisocyanate (IPDI), tetramethylxylenediisocyanate (TMXDI) or polymers or derivatives thereof.

If desired, the barrier layer may include other auxiliary substances which may be added to the final composition in relative amounts in order to impart desirable properties or to suppress undesirable properties. Examples of such substances include viscosity modifiers, dispersant, fillers, plasticizers, pigments, dyes, wetting agents, heat stabilizers, carbon black, silica sols, leveling agents, antifoaming agents, UV-stabilizers and the like. The composition may also be blended with other polymer dispersions such as polyvinyl acetate, epoxy resins, polyethylene, polybutadiene, polyvinyl chloride, polyacrylate and other homopolymer and copolymer dispersions.

Of course, the barrier layer is not limited to those materials described above. For example, the barrier layer may include any suitable material useful for inhibiting the passage of oxygen and/or water through the layer. For instance, any resinous material (e.g., epoxy) can be utilized to form a barrier layer.

Since permeability is a function of diffusion, a thicker coat weight slows permeability. Thus, varying the film thickness affects the oxygen and moisture vapor transmission rate. However, the advantage of a thicker barrier layer must be weighed against any adverse affect that a thicker coat may impart on the performance of the resulting coated capacitor.

Thus, as a result of the present invention, a capacitor may be formed that exhibits excellent electrical properties. For instance, it is believed that the protective adhesive layer of the present invention improves the mechanical stability of the interface between the conductive polymer and the dielectric layer. This mechanically stable interface can result in a highly continuous and dense conductive polymer with high conductivity, thereby providing low equivalent series resistance (ESR). The equivalent series resistance of a capacitor generally refers to the extent that the capacitor acts like a resistor when charging and discharging in an electronic circuit and is usually expressed as a resistance in series with the capacitor. For example, a capacitor of the present invention typically has an ESR less than about 1000 milliohms (mohms), in some embodiments less than about 500 mohms, and in some embodiments less than about 100 mohms.

Additionally, when a capacitor is formed having a barrier layer as described above, the resulting capacitor can have an ESR less than about 1000 milliohms (mohms), in some embodiments less than about 500 mohms, and in some embodiments, less than about 125 mohms, even after aging for 1000 hours at 85° C. and at 85% relative humidity. Thus, a capacitor formed having a barrier layer as described above can have a relatively small change in ESR after aging for 1000 hours at 85° C. and at 85% relative humidity (when compared to its ESR before aging), such as less than 500%, in some embodiments, less than 100%, and in some embodiments less than 25%.

In addition, after the anode is healed through the application of voltage, the resulting leakage current, which generally refers to the current flowing from one conductor to an adjacent conductor through an insulator, can be maintained at relatively low levels due to the mechanical stability of the interface provided by the protective adhesive layer. For example, the numerical value of the normalized leakage current of a capacitor of the present invention is, in some embodiments, less than about $0.1\ \mu A/\mu F^*V$, in some embodiments less than about $0.01\ \mu A/\mu F^*V$, and in some embodiments, less than about $0.001\ \mu A/\mu F^*V$, where $\mu A$ is microamps and $\mu F^*V$ is the product of the capacitance and the rated voltage.

The present invention may be better understood by reference to the following examples.

TEST PROCEDURES

Equivalent Series Resistance (ESR), Capacitance, and Dissipation Factor:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 2 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

EXAMPLE 1

The ability to form a tantalum capacitor having a conductive polymer layer formed from a polymerization solution was demonstrated. In particular, 50,000 µFV/g tantalum powder was pressed into pellets and sintered to form a porous electrode body. The pellets were anodized in a phosphoric acid electrolyte in water and subsequently shell formed in water/ethylene glycol electrolyte to form the dielectric layer. A protective adhesive layer was applied to the porous electrode body from a solution of one part by weight polyvinylalcohol and one part by weight methyl methacrylate in ninety-eight parts of water. The solution was formed by gently heating to 70° C. The anode pellets were immersed in this solution and dried for 15 minutes at a temperature of 100° C.

A polymerization solution was prepared to form the conductive polymer coating. The polymerization solution prepared with twelve parts by weight ethanol, 0.3 parts per weight methyl methacrylate, 0.1 part by weight methylpyrrolidone, 1 part by weight 3,4-ethylenedioxythiophene (sold under the name Baytron® M by Bayer Corp.), and 10 parts by weight iron III tosylate in butanol (sold under the name Baytron® CB40 by Bayer Corp.). The solution was used to impregnate and coat the anode pellets having the dielectric layer and the protective adhesive layer. The anode pellets were immersed in the polymerization solution cooled to 5° C.

and kept under dry air. The monomers of the polymerization solution were polymerized for one hour at ambient temperature and 60% relative humidity. The anode pellets were immersed in the polymerization solution and polymerized a total of six times to form the conductive polymer layer.

Another polymerization solution was prepared with the same ingredients as above in the first step, except it was diluted six times by weight ethanol. The anode pellets having the conductive polymer layer were immersed in this solution while at 5° C. and kept under dry air and re-anodized. After re-anodization, the resulting pellets were polymerized at ambient temperature and 60% relative humidity.

The pellets were then coated with a graphite and silver coating.

Finally, a solution comprising two parts by weight polyurethane diol (Sigma-Aldrich Co.) and two parts polyethyleneimine (Sigma-Aldrich Co.) in ninety six parts of ethanol was produced. The pellets with such covered cathode were immersed in this solution and then dried at 25° C. for 30 min.

The finished parts were completed by conventional assembly technology and measured.

EXAMPLE 2

50,000 μFV/g tantalum powder was pressed into pellets and sintered to form a porous electrode body. The pellets were anodized in a phosphoric acid electrolyte in water and subsequently shell formed in water/ethylene glycol electrolyte. The porous electrode body was applied with a solution one part by weight 3,4-ethylenedioxythiophene (Baytron® M, H. C. Starck GmbH), twenty parts by weight iron(III) tosylate in butanol (Baytron® CB40, H. C. Starck GmbH) and twelve parts by weight ethanol. The solution was used to impregnate of anode pellets with pre-coated dielectrics. The anode pellets were immersed in this solution, cooled at 5° C. and kept under dry air, and then polymerized for one hour at ambient temperature and 60% relative humidity. The anode pellets were immersed in the polymerization solution and polymerized a total of six times to form the conductive polymer layer.

Another polymerization solution was prepared with the same ingredients as above in the first step, except it was diluted six times by weight ethanol. The anode pellets with polymeric layer were immersed in this solution, cooled at 5° C. and kept under dry air, and re-anodized. After re-anodization these pellets were polymerized at ambient temperature and 60% relative humidity. The pellets were then coated with a graphite and silver coating. The finished parts were completed by conventional assembly technology and measured.

The parameters of the samples made are shown in Table 1:

TABLE 1

| Capacitor | Cap (μF) | DF (%) | ESR (mΩ) | Leakage Current (μA) |
|---|---|---|---|---|
| Example 1 | 9.9 | 2.0 | 95 | 1.2 |
| Example 2 | 9.8 | 1.9 | 122 | 2.0 |

The stability of the resulting capacitors were also tested after exposure to different environments. Specifically, samples from each Example 1 and the Comparative Example were exposed to an environment of 85% relative humidity at 85° C. for 1000 (as shown in Table 2), and changes in the capacitor's performance were measured.

TABLE 2

| | Temp (° C.) | R. H. (%) | Time (hours) | % Change in | | | |
| | | | | Cap | DF | ESR | Leakage Current |
|---|---|---|---|---|---|---|---|
| Example 1 | 85 | 85 | 1000 | 10 | −10 | 20 | 0 |
| Example 2 | 85 | 85 | 1000 | −100 | 10000 | 15000 | 0 |

The capacitors of Example 1, which have a barrier layer, were much more stable after aging in such environments, and showed much less change in properties These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
   an anode;
   a dielectric layer overlying the anode;
   a protective adhesive layer overlying the dielectric layer, wherein the protective adhesive layer comprises a polymer having a repeating unit with a functional hydroxyl group, wherein the polymer has a degree of hydrolysis of at least about 90 mole %; and
   a solid electrolyte layer overlying the protective adhesive layer.

2. A solid electrolytic capacitor as in claim 1, wherein the polymer comprises a hydrophilic polymer.

3. A solid electrolytic capacitor as in claim 1, wherein the polymer has a degree of hydrolysis of at least about 95 mole %.

4. A solid electrolytic capacitor as in claim 1, wherein the polymer is poly(vinyl alcohol) or a copolymer thereof.

5. A solid electrolytic capacitor as in claim 1, wherein the protective adhesive layer further comprises an acrylate, methacrylate, or a combination thereof.

6. A solid electrolytic capacitor as in claim 1, wherein the protective adhesive layer has a resistivity of greater than about 5 ohm-cm.

7. A solid electrolytic capacitor as in claim 1, wherein the protective adhesive layer has a resistivity of greater than about 1000 ohm-cm.

8. A solid electrolytic capacitor as in claim 1, wherein the protective adhesive layer has a thickness of about 50 micrometers or less.

9. A solid electrolytic capacitor as in claim 1, wherein the solid electrolyte layer comprises a conductive polymer.

10. A solid electrolytic capacitor comprising:
    an anode;
    a dielectric layer overlying the anode;
    a protective adhesive layer overlying the dielectric layer, wherein the protective adhesive layer comprises a polymer having a repeating unit with a functional hydroxyl group; and
    a solid electrolyte layer overlying the protective adhesive layer, wherein the solid electrolyte layer comprises a conductive polymer, and wherein the conductive polymer is polymerized in the presence of less than a stoichiometric amount of the oxidative polymerization catalyst.

11. A solid electrolytic capacitor as in claim 1, further comprising a barrier layer overlying the solid electrolyte layer.

12. A solid electrolytic capacitor as in claim 1, wherein the anode contains a valve metal.

13. A solid electrolytic capacitor as in claim 12, wherein the anode contains tantalum or a niobium oxide.

14. A solid electrolytic capacitor as in claim 10, wherein the polymer has a degree of hydrolysis of at least about 90 mole %.

15. A solid electrolytic capacitor as in claim 10, wherein the polymer has a degree of hydrolysis of at least about 95 mole %.

16. A solid electrolytic capacitor as in claim 10, wherein the polymer is poly(vinyl alcohol) or a copolymer thereof.

17. A solid electrolytic capacitor as in claim 10, wherein the protective adhesive layer further comprises an acrylate, methacrylate, or a combination thereof.

18. A solid electrolytic capacitor as in claim 10, wherein the protective adhesive layer has a resistivity of greater than about 5 ohm-cm.

19. A solid electrolytic capacitor as in claim 10, wherein the protective adhesive layer has a resistivity of greater than about 1000 ohm-cm.

20. A solid electrolytic capacitor as in claim 10, wherein the protective adhesive layer has a thickness of about 50 micrometers or less.

21. A solid electrolytic capacitor as in claim 10, further comprising a barrier layer overlying the solid electrolyte layer.

22. A solid electrolytic capacitor as in claim 10, wherein the anode contains a valve metal.

23. A solid electrolytic capacitor as in claim 22, wherein the anode contains tantalum or a niobium oxide.

24. A solid electrolytic capacitor comprising:
    an anode containing a valve metal;
    a dielectric layer overlying the anode;
    a protective adhesive layer overlying the dielectric layer, wherein the protective adhesive layer comprises a vinyl alcohol copolymer, wherein the vinyl alcohol copolymer is at least 90 mole % hydrolyzed; and
    a solid electrolyte layer overlying the protective adhesive layer.

25. A solid electrolytic capacitor as in claim 24, wherein the vinyl alcohol co-polymer is formed from a monomer that includes an acrylic ester, methacrylic ester, or a combination thereof.

26. A solid electrolytic capacitor as in claim 24, wherein the protective adhesive layer has a resistivity of greater than about 5 ohm-cm.

27. A solid electrolytic capacitor as in claim 24, wherein the protective adhesive layer has a thickness of about 50 micrometers or less.

28. A solid electrolytic capacitor as in claim 24, wherein the solid electrolyte layer comprises a conductive polymer.

29. A solid electrolytic capacitor as in claim 24, wherein the anode contains tantalum or a niobium oxide.

30. A solid electrolytic capacitor comprising:
    an anode;
    a dielectric layer overlying the anode;
    a protective adhesive layer overlying the dielectric layer, wherein the protective adhesive layer comprises a polymer having a repeating unit with a functional hydroxyl group, wherein the polymer is a vinyl alcohol co-polymer formed from a monomer that includes an acrylic ester, methacrylic ester, or a combination thereof; and
    a solid electrolyte layer overlying the protective adhesive layer, wherein the solid electrolyte layer comprises a conductive polymer.

31. A solid electrolytic capacitor as in claim 30, wherein the monomer comprises methyl methacrylate.

32. A solid electrolytic capacitor as in claim 30, wherein the polymer has a degree of hydrolysis of at least about 90 mole %.

33. A solid electrolytic capacitor as in claim 30, wherein the polymer has a degree of hydrolysis of at least about 95 mole %.

34. A solid electrolytic capacitor as in claim 30, wherein the protective adhesive layer further comprises an acrylate, methacrylate, or a combination thereof.

35. A solid electrolytic capacitor as in claim 30, wherein the protective adhesive layer has a resistivity of greater than about 5 ohm-cm.

36. A solid electrolytic capacitor as in claim 30, wherein the protective adhesive layer has a resistivity of greater than about 1000 ohm-cm.

37. A solid electrolytic capacitor as in claim 30, wherein the protective adhesive layer has a thickness of about 50 micrometers or less.

38. A solid electrolytic capacitor as in claim 30, wherein the solid electrolyte layer comprises a conductive polymer.

39. A solid electrolytic capacitor as in claim 30, wherein the conductive polymer is polymerized in the presence of less than a stoichiometric amount of the oxidative polymerization catalyst.

40. A solid electrolytic capacitor as in claim 30, further comprising a barrier layer overlying the solid electrolyte layer.

41. A solid electrolytic capacitor as in claim 30, wherein the anode contains a valve metal.

42. A solid electrolytic capacitor as in claim 41, wherein the anode contains tantalum or a niobium oxide.

* * * * *